US012769551B2

(12) United States Patent
Nandanwar et al.

(10) Patent No.: US 12,769,551 B2
(45) Date of Patent: Oct. 20, 2026

(54) DYNAMICALLY RECONFIGURING AN OUT-OF-ORDER PROCESSING CIRCUIT IN A PROCESSING UNIT TO PROCESS INSTRUCTIONS IN ORDER BASED ON POWER CONSUMPTION OF A WORKLOAD

(71) Applicant: QUALCOMM Incorporated, San Diego, CA (US)

(72) Inventors: Darshan Kumar Nandanwar, Bangalore (IN); Kartik Gunvantbhai Desai, Savarkundla (IN)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 18/583,822

(22) Filed: Feb. 21, 2024

(65) Prior Publication Data

US 2025/0265084 A1 Aug. 21, 2025

(51) Int. Cl.
*G06F 9/30* (2018.01)
*G06F 1/32* (2019.01)
(Continued)

(52) U.S. Cl.
CPC ........ *G06F 9/30145* (2013.01); *G06F 1/3206* (2013.01); *G06F 1/3287* (2013.01); *G06F 9/3836* (2013.01); *G06F 9/3854* (2023.08)

(58) Field of Classification Search
None
See application file for complete search history.

(56) References Cited

U.S. PATENT DOCUMENTS 8,037,366 B2 * 10/2011 Abernathy ............ G06F 9/3863 714/49
8,099,582 B2 * 1/2012 Abernathy ............ G06F 9/3836 712/216
(Continued)

FOREIGN PATENT DOCUMENTS

EP 2684127 B1 * 6/2020 ........... G06F 9/3888
WO WO-2007103051 A2 * 9/2007 ........... G06F 1/3203

OTHER PUBLICATIONS

Machine Translation of Japanese Patent Application JP 2014507737 A, published 2014. (Year: 2014).*
(Continued)

*Primary Examiner* — Steven G Snyder
(74) *Attorney, Agent, or Firm* — W&T

(57) ABSTRACT

Aspects disclosed include dynamically reconfiguring an out-of-order processing circuit in a processing unit to process instructions in order based on a performance/power consumption measurement. The processing unit includes an in-order processing circuit which decodes a plurality of instructions in a first order into a plurality of decoded instructions and an out-of-order processing circuit which processes the plurality of decoded instructions out of order of the first order. The processing unit measures performance/power consumption metric of the processing unit. The processor-based system which includes the processing unit determines whether the performance/power consumption metric can be increased beyond a threshold. If so, the out-of-order processing circuit is further configured to process the plurality of instructions in the processing unit in the first order.

20 Claims, 9 Drawing Sheets

(51) Int. Cl.
*G06F 1/3206* (2019.01)
*G06F 1/3287* (2019.01)
*G06F 9/38* (2018.01)

(56) References Cited

U.S. PATENT DOCUMENTS

| | | | | |
|---|---|---|---|---|
| 9,009,451 | B2 * | 4/2015 | Murray | G06F 9/3836 712/214 |
| 9,501,132 | B2 * | 11/2016 | Mishaeli | G06F 1/3287 |
| 11,010,166 | B2 * | 5/2021 | Mohapatra | G06F 9/30101 |
| 2010/0228955 | A1 * | 9/2010 | Niggemeier | G06F 1/3234 712/214 |
| 2010/0250902 | A1 * | 9/2010 | Abernathy | G06F 9/3836 712/216 |
| 2010/0251016 | A1 * | 9/2010 | Abernathy | G06F 9/3863 712/214 |
| 2014/0181487 | A1 * | 6/2014 | Sasanka | G06F 11/3452 713/1 |
| 2014/0189301 | A1 * | 7/2014 | Gorbatov | G06F 9/5094 712/30 |
| 2014/0281612 | A1 * | 9/2014 | Varma | G06F 1/3203 713/322 |
| 2015/0121048 | A1 | 4/2015 | Lukefahr et al. | |
| 2016/0116964 | A1 | 4/2016 | Wu et al. | |
| 2018/0129503 | A1 * | 5/2018 | Narayan | H03K 19/0175 |
| 2021/0173004 | A1 * | 6/2021 | Perley | G06F 13/4027 |
| 2021/0224071 | A1 * | 7/2021 | Batley | G06F 1/3293 |
| 2022/0100563 | A1 * | 3/2022 | Gutierrez | G06F 9/3802 |
| 2025/0093931 | A1 * | 3/2025 | Nemani | G06F 1/3243 |

OTHER PUBLICATIONS

Machine Translation of Japanese Patent Application JP 2008513912 A, published 2008. (Year: 2008).*

Machine Translation of Japanese Patent Application JP 2013537346 A, published 2013. (Year: 2013).*

'Single-ISA Heterogeneous Multi-Core Architectures: The Potential for Processor Power Reduction' by Rakesh Kumar et al., copyright 2003, IEEE. (Year: 2003).*

International Search Report and Written Opinion for International Patent Application No. PCT/US2025/011391, mailed Apr. 29, 2025, 14 pages.

Lukefahr, A. et al., "Composite Cores: Pushing Heterogeneity into a Core," 2012 45th Annual IEEE/ACM International Symposium on Microarchitecture, Dec. 2012, IEEE, 13 pages.

* cited by examiner

400

506 508 510

| Benchmark | Performance/ Watt Target (mW) | Performance/Watt Threshold Percentage | Switches/million retired instructions |
|---|---|---|---|
| Benchmark_1 | 600 | 55-65 | 230 |
| Benchmark_2 | 800 | 55-60 | 180 |
| Benchmark_3 | 750 | 50-55 | 300 |
| Benchmark_4 | 550 | 50-55 | 100 |
| Benchmark_5 | 260 | 55-60 | 105 |
| Benchmark_6 | 320 | 55-60 | 60 |
| Benchmark_7 | 420 | 65-70 | 120 |
| Benchmark_8 | 440 | 65-70 | 120 |
| Benchmark_9 | 490 | 60-65 | 170 |

*FIG. 5C*

DYNAMICALLY RECONFIGURING AN OUT-OF-ORDER PROCESSING CIRCUIT IN A PROCESSING UNIT TO PROCESS INSTRUCTIONS IN ORDER BASED ON POWER CONSUMPTION OF A WORKLOAD

BACKGROUND

I. Field of the Disclosure

The field of the disclosure relates to processing stages in a processor-based system (e.g., a graphics processing unit (GPU)-based system, a central processing unit (CPU)-based system) and, in particular, to dynamically reconfiguring an out-of-order processing circuit in a processing unit.

II. Background

Microprocessors, also known as processing units (PUs), perform computational tasks in a wide variety of applications. One type of conventional microprocessor or PU is a central processing unit (CPU). Another type of microprocessor or PU is a dedicated processing unit known as a graphics processing unit (GPU). A GPU is designed with specialized hardware to accelerate the rendering of graphics and video data for display. A GPU may be implemented as an integrated element of a general-purpose CPU or as a discrete hardware element that is separate from the CPU. A PU(s) executes software instructions that instruct a processor to fetch data from a location in memory and to perform one or more processor operations using the fetched data. The result may then be stored in memory. For example, this memory can be a cache memory local to the PU, a shared local cache among PUs in a PU block, a shared cache among multiple PU blocks, and/or a system memory in a processor-based system.

Cache memory, which can also be referred to as just "cache," is a smaller, faster memory that stores copies of data stored at frequently accessed memory addresses in a main memory or higher-level cache memory to reduce memory access latency. Thus, a cache memory can be used by a PU to reduce memory access times.

PUs may have either an in-order processing pipeline or an out-of-order processing pipeline. An in-order processing pipeline executes instructions in the same order as they appear in a program, while an out-of-order processing pipeline executes instructions based on their dependencies and availability of data. This means that an in-order processing pipeline can only execute one instruction per cycle, while an out-of-order processing pipeline can execute multiple instructions per cycle by reordering them.

An in-order processing pipeline has some advantages, such as simplicity, predictability, and easier debugging. However, it also has some disadvantages, such as longer execution time, higher memory latency, and more stalls due to data dependencies. A stall is a situation where a processor cannot execute an instruction because it depends on another instruction that is not yet ready or available. An out-of-order processing pipeline has some advantages over an in-order processing pipeline, such as faster execution time, lower memory latency, and less stalls due to data dependencies. However, it also has some disadvantages, such as complexity, unpredictability, and harder debugging. Both pipelines have their pros and cons depending on the type of program and the hardware architecture of the respective pipeline. Some modern system-on-chips (SoCs) that contain a number of processors use a hybrid approach where some of the processors have in-order processing pipelines while other processors have out-of-order processing pipelines to achieve the advantages of both pipelines.

SUMMARY

Aspects disclosed in the detailed description include dynamically reconfiguring an out-of-order processing circuit in a processing unit to process instructions in order based on power consumption of a workload. A processor-based system includes the processing unit. The processing unit includes an in-order processing circuit configured to decode a plurality of instructions in a first order into a plurality of decoded instructions, and an out-of-order processing circuit configured to process the plurality of decoded instructions out of order of the first order. The processing unit is configured to measure a number of a plurality of retired instructions in the processing unit per cycle and to measure a power consumption of the processing unit for the number of the plurality of retired instructions. The processor-based system is configured to determine whether the number of the plurality of retired instructions in the processing unit per cycle per the power consumption of the processing unit can be increased beyond an instructions per cycle per power consumption threshold. In response to determining the number of the plurality of retired instructions in the processing unit per cycle per the power consumption of the processing unit can be increased beyond the instructions per cycle per power consumption threshold, the out-of-order processing circuit is further configured to process the plurality of instructions in the processing unit in the first order. In this regard, the processing unit advantageously modifies its out-of-order processing circuit into an in-order processing unit while running a workload to improve the performance/power consumption metric of the processing unit.

In this regard in one aspect, a processor-based system includes a first processing unit. The first processing unit comprises an in-order processing circuit configured to decode a plurality of instructions in a first order into a plurality of decoded instructions and an out-of-order processing circuit configured to process the plurality of decoded instructions out of order of the first order. The first processing unit is configured to measure a number of a plurality of retired instructions in the first processing unit per cycle and measure a power consumption of the first processing unit for the number of the plurality of retired instructions. The processor-based system is configured to determine whether the number of the plurality of retired instructions in the first processing unit per cycle per the power consumption of the first processing unit can be increased beyond an instructions per cycle per power consumption threshold. The out-of-order processing circuit is further configured to process the plurality of instructions in the first processing unit in the first order, in response to the determination that the number of the plurality of retired instructions in the first processing unit per cycle per the power consumption of the first processing unit can be increased beyond the instructions per cycle per power consumption threshold.

In another aspect, a method for dynamically reconfiguring out-of-order processing circuits in a first processing unit is disclosed. The method comprises decoding a plurality of instructions in a first order into a plurality of decoded instructions, processing the plurality of decoded instructions out of order of the first order, measuring a number of a plurality of retired instructions in the first processing unit per cycle, measuring a power consumption of the first processing unit for the number of the plurality of retired instructions, determining whether the number of the plurality of retired instructions in the first processing unit per cycle per the power consumption of the first processing unit can be increased beyond an instructions per cycle per power consumption threshold, and processing the plurality of instructions in the first processing unit in the first order, in response to determining the number of the plurality of retired instructions in the first processing unit per cycle per the power consumption of the first processing unit can be increased beyond the instructions per cycle per power consumption threshold.

In another aspect, a processor-based system for dynamically reconfiguring out-of-order processing circuits in a first processing unit is disclosed. The processor-based system comprises means for decoding a plurality of instructions in a first order into a plurality of decoded instructions, means for processing the plurality of decoded instructions out of order of the first order, means for measuring a number of a plurality of retired instructions in the first processing unit per cycle, means for measuring a power consumption of the first processing unit for the number of the plurality of retired instructions, means for determining whether the number of the plurality of retired instructions in the first processing unit per cycle per the power consumption of the first processing unit can be increased beyond an instructions per cycle per power consumption threshold, and means for processing the plurality of instructions in the first processing unit in the first order, in response to the determination that the number of the plurality of retired instructions in the first processing unit per cycle per the power consumption of the first processing unit can be increased beyond the instructions per cycle per power consumption threshold.

BRIEF DESCRIPTION OF THE DRAWINGS

FIG. 5C is a table illustrating exemplary set of pre-defined instructions per cycle per power consumption thresholds for an array of benchmarks;

DETAILED DESCRIPTION

Figure 1:
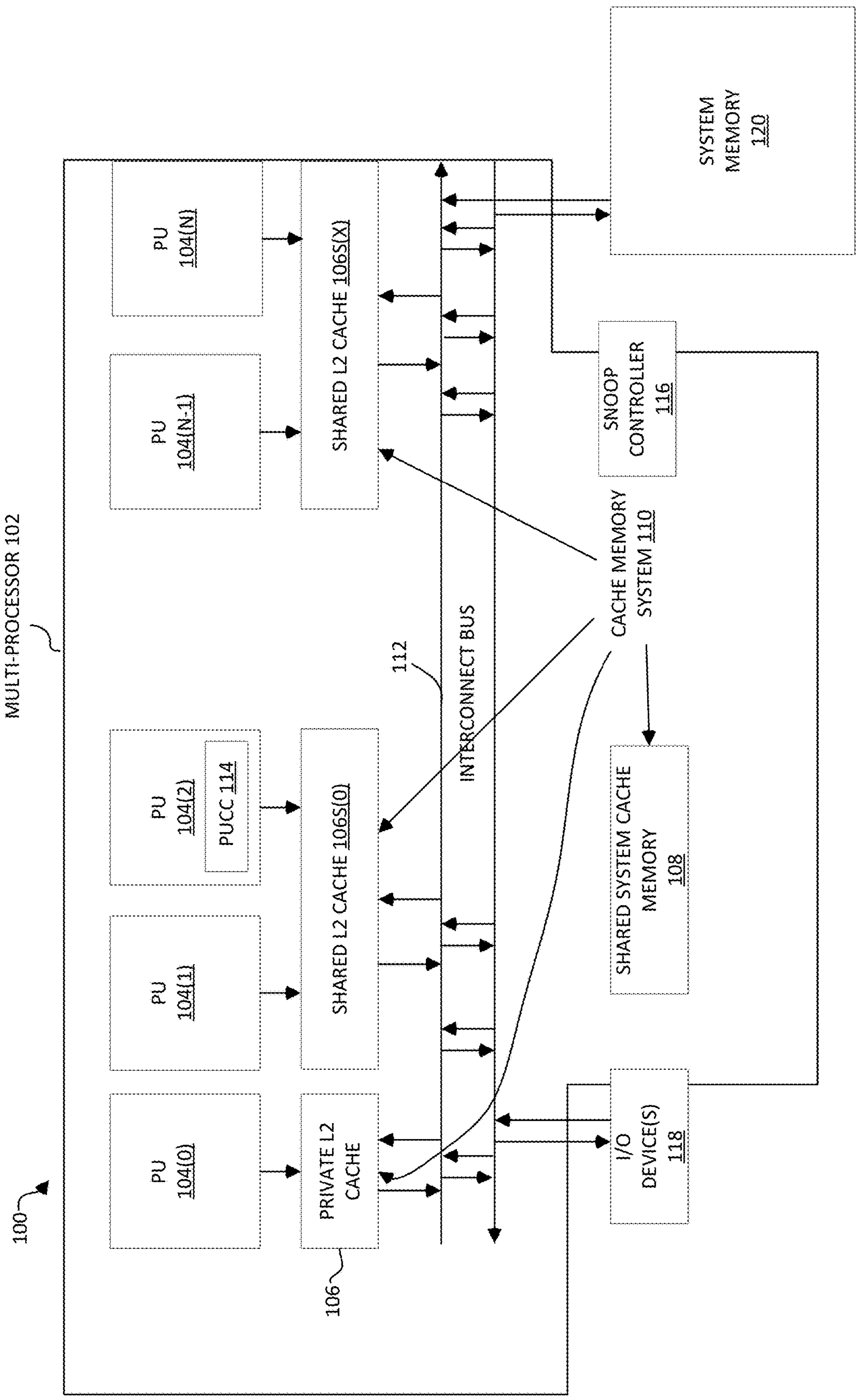
FIG. 1 is a block diagram of an exemplary processor-based system that includes multiple processing units (PUs) and a memory system that includes a cache memory system including a hierarchy of local and shared cache memories and a system memory, and wherein the processor-based system includes a processing unit control circuit (PUCC) to dynamically reconfigure an out-of-order processing circuit in a processing unit to process instructions in order based on performance/power consumption of a workload.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include dynamically reconfiguring an out-of-order processing circuit in a processing unit to process instructions in order based on power consumption of a workload. A processor-based system includes the processing unit. The processing unit includes an in-order processing circuit configured to decode a plurality of instructions in a first order into a plurality of decoded instructions, and an out-of-order processing circuit configured to process the plurality of decoded instructions out of order of the first order. The processing unit is configured to measure a number of a plurality of retired instructions in the processing unit per cycle and to measure a power consumption of the processing unit for the number of the plurality of retired instructions. The processor-based system is configured to determine whether the number of the plurality of retired instructions in the processing unit per cycle per the power consumption of the processing unit can be increased beyond an instructions per cycle per power consumption threshold. In response to determining the number of the plurality of retired instructions in the processing unit per cycle per the power consumption of the processing unit can be increased beyond the instructions per cycle per power consumption threshold, the out-of-order processing circuit is further configured to process the plurality of instructions in the processing unit in the first order. In this regard, the processing unit advantageously modifies its out-of-order processing circuit into an in-order processing unit while running a workload to improve the performance/power consumption metric of the processing unit.

In this regard, FIG. 1 is a block diagram of an exemplary processor-based system 100 that includes multiple processing units (PUs) and a memory system that includes a cache memory system including a hierarchy of local and shared cache memories and a system memory, and wherein the processor-based system includes a processing unit control circuit (PUCC) to dynamically reconfigure an out-of-order processing circuit in a processing unit to process instructions in order based on performance/power consumption of a workload. Before discussing these aspects, other exemplary aspects of the processor-based system 100 are first described below.

The processor-based system 100 includes a multiple (multi-) processing unit (PU) (multi-PU) processor 102, or also known as a multi-processor, that includes multiple PUs 104(0)-104(N) and a hierarchical memory system. The multiple PUs 104(0)-104(N) have their own out-of-order processing circuits, any or all of which can be dynamically reconfigured to process instructions in order based on performance/power consumption of a workload. The multiple PUs 104(0)-104(N) have their own private L1 instruction and data caches. A more detailed discussion of an out-of-order processing circuit will be discussed in connection with FIG. 2.

As part of the hierarchical memory system, for example, PU 104(0) includes a private local cache memory 106, which may be a Level 2 (L2) cache memory. PUs 104(1), 104(2) and PUs 104(N−1), 104(N) are configured to interface with respective local shared cache memories 106S(0)-106S(X), which may also be L2 cache memories for example. If a data read request requested by a PU 104(0)-104(N) results in a cache miss in their private L1 caches and to the respective cache memories 106, 106S(0)-106S(X), the read request may be communicated to a next-level cache memory, which in this example is a shared system cache memory 108. For example, the shared system cache memory 108 may be a Level 3 (L3) cache memory, also referred to as a last level cache. The private local cache memory 106, the local shared cache memories 106S(0)-106S(X), and the shared system cache memory 108 are part of a hierarchical cache memory system 110. The hierarchical cache memory system 110 may include both instructions and data. An interconnect bus 112, which may be a coherent bus, is provided that allows each of the PUs 104(0)-104(N) to access the local shared cache memories 106S(0)-106S(X) (if shared to the PU 104(0)-104(N)), the shared system cache memory 108, and other shared resources coupled to the interconnect bus 112.

The processor-based system 100 in FIG. 1 includes a processing unit control circuit (PUCC) 114 that is a processing unit and is configured to determine whether to dynamically reconfigure an out-of-order processing circuit in one or more of the multiple PUs 104(0)-104(N) in response to performance/power consumption of a workload being processed on a respective one of the PUs 104(0)-104 (N). The PUCC 114 is configured to receive a plurality of signals from the PUs 104(0)-104(N) over the interconnect bus 112. The plurality of signals are indicia of the workload being processed by the PUs 104(0)-104(N). In particular, the indicia of the workload includes a number of instructions retired per cycle and a power consumption of the respective PU for the number of instructions retired. In response to at least one of the plurality of signals from one of the PUs 104(0)-104(N), such as PU 104(0) for example, the PUCC 114 is configured to determine whether a performance/power consumption metric (i.e. instructions per cycle per power consumption) of the PU 104(0) can be increased beyond an instructions per cycle per power consumption threshold. In response to determining that the performance per power consumption of the PU 104(0) may be increased beyond the instructions per cycle per power consumption threshold, the PUCC 114 is also configured to trigger the PU 104(0) to reconfigure its out-of-order processing circuit to execute instructions in order. The PU 104(0), in response to being triggered by the PUCC 114, is configured to reconfigure its out-of-order processing circuit to execute instructions in order. Providing a PUCC that enables a processing unit to dynamically reconfigure its own out-of-order processing circuit advantageously provides for the processing unit to improve on its performance/power consumption metric depending on the current workload being processed by the processing unit. More details of a processing unit, such as the PU 104(0) will be discussed in connection with FIG. 2. The PUCC 114 will be discussed further in connection with FIG. 3.

With continuing reference to FIG. 1, the processor-based system 100 in this example also includes a snoop controller 116, which is also coupled to the interconnect bus 112. The snoop controller 116 is a circuit that monitors or snoops cache memory bus transactions on the interconnect bus 112 to maintain cache coherency among the cache memories 106, 106S(0)-106S(X), 108 in the cache memory system 110. Other shared resources that can be accessed by the PUs 104(0)-104(N) through the interconnect bus 112 can include input/output (I/O) devices 118 and a system memory 120 (e.g., a dynamic random access memory (DRAM)). If a cache miss occurs for a read request issued by a PU 104(0)-104(N) in their private L1 cache and in each level of the cache memories 106, 106S(0)-106S(X), 108 accessible for the PU 104(0)-104(N), the read request is serviced by the system memory 120, and the data associated with the read request is installed in the cache memories 106, 106S(0)-106S(X), 108 associated with the requesting PU 104(0)-104 (N). An example of a micro-architecture includes by-passing the cache memory system 110 on a read request such that the read request is sent from a PU, such as PU 104(1), directly to the system memory 120. The PUCC 114 may determine based on the workload being processed by the PU 104(1) that performance, such as latency delay read requests, may be improved by by-passing the cache memory system 110 and directing read requests to the system memory 120. Examples of the plurality of signals that are received by the PUCC 114 and other examples of modifying micro-architectural features will be discussed in connection with FIG. 5.

Figure 2A:
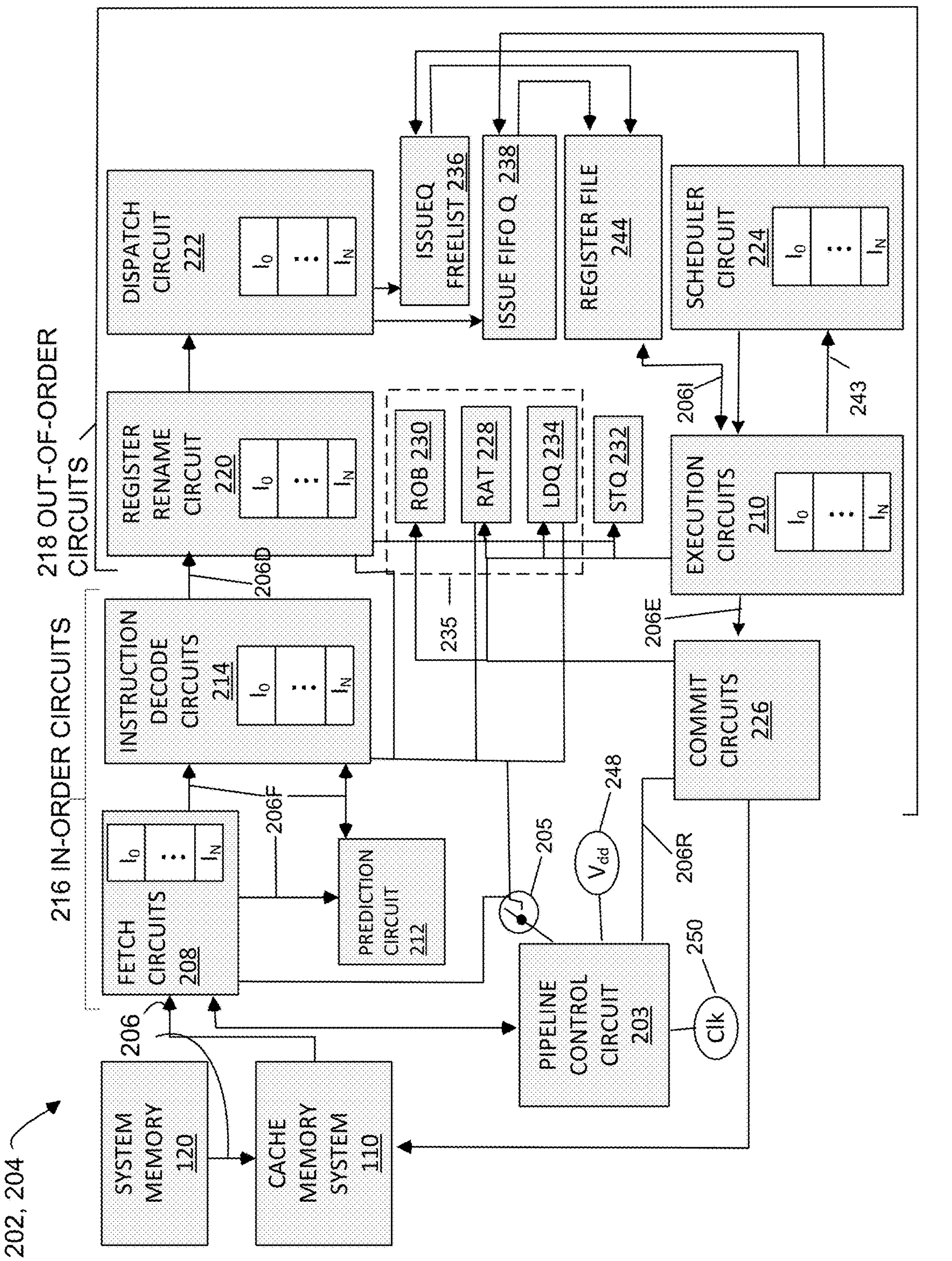
FIG. 2A is a block diagram an exemplary processing unit in the processor-based system of FIG. 1, wherein the exemplary processing unit dynamically reconfigures an out-of-order processing circuit in the exemplary processing unit to process instructions in order based on performance/power consumption of a workload.

FIG. 2A is a block diagram of an exemplary processing unit 202 in the processor-based system 100 of FIG. 1, such as the PUs 104(0)-104(N), which dynamically reconfigures an out-of-order processing circuit in the exemplary processing unit to process instructions in order based on performance/power consumption of a workload. Before describing the detailed operation of the processing unit 202 below, the PUCC 114, in short, determines whether a number of the plurality of retired instructions in the processing unit 202 per cycle per the power consumption of the processing unit 202 can be increased beyond an instructions per cycle per power consumption threshold. If so, the PUCC 114 triggers the processing unit 202 to execute a plurality of instructions in order and does so, for example, by posting an interrupt to the cache memory system 110. The processing unit 202 interrupts its processing to retrieve interrupt handler instructions from the cache memory system 110 or the system memory 120. The processing unit 202, an in particular, a pipeline control circuit 203, as will be described further below, will process the interrupt handler instructions to save the state (e.g., architectural register, program counter, and the like) of the processing unit 202, flush instructions in the processing unit 202, control switches 205 to gate off buffers and circuits used for out-of-order processing, re-load the state of processing unit 202 and begin fetching instructions to be processed entirely in order.

Returning to the detailed operation of the processing unit 202, the processing unit 202 may be provided in a system-on-a-chip (SoC) 204 as an example. In this regard, instructions 206, including integer and vector instructions, are fetched by instruction fetch circuits 208 from the cache memory system 110. The instruction fetch circuits 208 are configured to provide the instructions 206 as fetched instructions 206F into one or more parallel instruction lanes $I_0$-$I_N$ in the processing unit 202 to be pre-processed, before the fetched instructions 206F reach one or more execution circuits 210, such as integer execution circuits and vector execution circuits in the processing unit 202, to be executed. The instruction fetch circuits 208 may include parallel fetch circuits that fetch multiple streams of instructions (i.e., N-ways), or fetch groups, in parallel. Each fetch group maps to one of the instruction lanes $I_0$-$I_N$ and are provided across different processing circuits or stages of the processing unit 202 to pre-process and process the fetched instructions 206F in a series of steps that are performed concurrently to increase throughput prior to execution of the fetched instructions 206F in the execution circuits 210.

With continuing reference to FIG. 2A, a prediction circuit 212 (e.g., a branch prediction circuit, a memory stride prediction circuit, and the like) is also provided to speculate or predict a target address for a control flow fetched instruction 206F, such as a conditional branch instruction. The prediction of the target address by the prediction circuit 212 is used by the instruction fetch circuits 208 to determine the next fetched instructions 206F to fetch based on the predicted target address. Instruction decode circuits 214 are configured to decode the fetched instructions 206F fetched by the instruction fetch circuits 208 into decoded instructions 206D (also referred to as micro-ops) to determine the type of instructions 206 and actions required. The instruction decode circuits 214 may include parallel instruction decode circuits that decode instruction lanes $I_0$-$I_N$ in parallel. In-order circuits 216 include the instruction fetch circuits 208 and the instruction decode circuits 214. The in-order circuits 216 are also referred to as front-end circuits.

With continuing reference to FIG. 2A, in this example, the decoded instructions 206D are then placed in the instruction lanes $I_0$-$I_N$ and are next provided to out-of-order circuits 218 which include a register rename circuit 220, a dispatch circuit 222, a scheduler circuit 224, the execution circuits 210, and commit circuits 226. When the out-of-order circuits 218 are configured to process instructions out of order, the register rename circuit 220 resolves architectural register references between instructions in a fetch group by assigning various physical registers to the same architectural register in a register alias table (RAT) 228. The register rename circuit 220 resolves dependencies between operands of instructions in the fetch group and orders the instructions, which can be processed out of the order in which the instructions in a fetch group were fetched, based on these dependencies, and stores them in a reorder buffer (ROB) 230.

When the out-of-order circuits 218 are configured to process instructions in order, there is a 1:1 mapping between an architectural register and a physical register, and the program order in which the instructions are fetched already determines the operand order such that the register renaming circuit 220 does not need to resolve operand dependencies. Also, the logic circuits associated with the ROB 230 to reorder instructions is no longer needed since instructions will be processed in order. To conserve temporary storage within the out-of-order circuits 218, the data space associated with the ROB 230 may be re-purposed and partitioned to store instruction information for each active instruction stream when the out-of-order circuits 218 are configured to process instructions in order. That said, decoupling the ROB 230 means decoupling the logic circuits associated with out of order processing. If the register rename circuit 220 is processing a LOAD instruction, it will query a store queue (STQ) 232 to determine if the data for the LOAD instruction was held in the STQ 232 as a result of a previous STORE instruction.

When the out-of-order-processing circuits 218 are configured to process instruction out of order, the register rename circuit 220 utilizes a load queue (LDQ) 234 to store the results of one or more previous LOAD instructions to resolve order dependencies of LOAD instructions in the same fetch group. The RAT 228, the ROB 230, and the LDQ 234, collectively referred to as out-of-order buffers 235, allow instructions in a fetch group to be processed out of order from the order the instructions were fetched in the fetch group (also referred to as program order).

The instruction lanes $I_0$-$I_N$ are next provided to the dispatch circuit 222. The dispatch circuit 222 directs the instruction lanes to an array of parallel first-in, first-out (FIFO) issue queues such as an issue queue free list 236 (e.g., an array of first-in first-out queues, one for each fetch group) or an issue FIFO queue 238 (e.g., a single queue) depending on whether the out-of-order circuits 218 are configured for out-of-order or in-order processing, respectively. The depth of each queue in the issue queue free list 236 are much larger than the depth of the issue FIFO queue 238 to address the dependency of different fetch groups feeding the issue queue free list 236. In out-of-order processing, each of the instruction fetch groups are directed to a corresponding issue queue in the issue queue free list 236. The order in which each instruction fetch group is placed in the issue queue free list 236 is determined by its location in the ROB 230 and not the order in which the instructions were fetched. In in-order processing, the order in which each instruction fetch group is placed in the issue FIFO queue 238 is the order in which the instructions were fetched. The instructions wait in these queues until their data dependencies such as operand dependencies are resolved.

When the out-of-order circuits 218 are configured to process instructions out of order, the scheduler circuit 224 is configured to select instructions from the issue queue free list 236 and will be discussed in more detail in connection with FIG. 2B. The scheduler circuit 224 is also configured to monitor which of the execution circuits 210 are available and whose function such as, but not limited to, scalar and vector functions including ADD, MULTIPLY, Vector ADD, Vector MULTIPLY, and the like can service the next instruction(s) in the issue queue free list 236. The execution circuits 210 may include multiple instances of similar functional execution circuits that can execute instructions in parallel. In other words, the execution circuits 210 may include a plurality of parallel execution circuits each coupled to a power source. The scheduler circuit 224 is also configured to determine when the operand and architecture-to-physical register data dependencies of the selected instructions are resolved. In this regard, the scheduler circuit 224 is configured to provide the retrieved produced value from a previously executed instruction 206E as the source register operand of an instruction to be executed. Once both the operand and architecture-to-physical register data dependencies of the selected instruction are resolved and an appropriate execution circuit is available, the scheduler circuit 224 directs the selected instructions to the available execution circuits in the execution circuits 210.

Figure 2B:
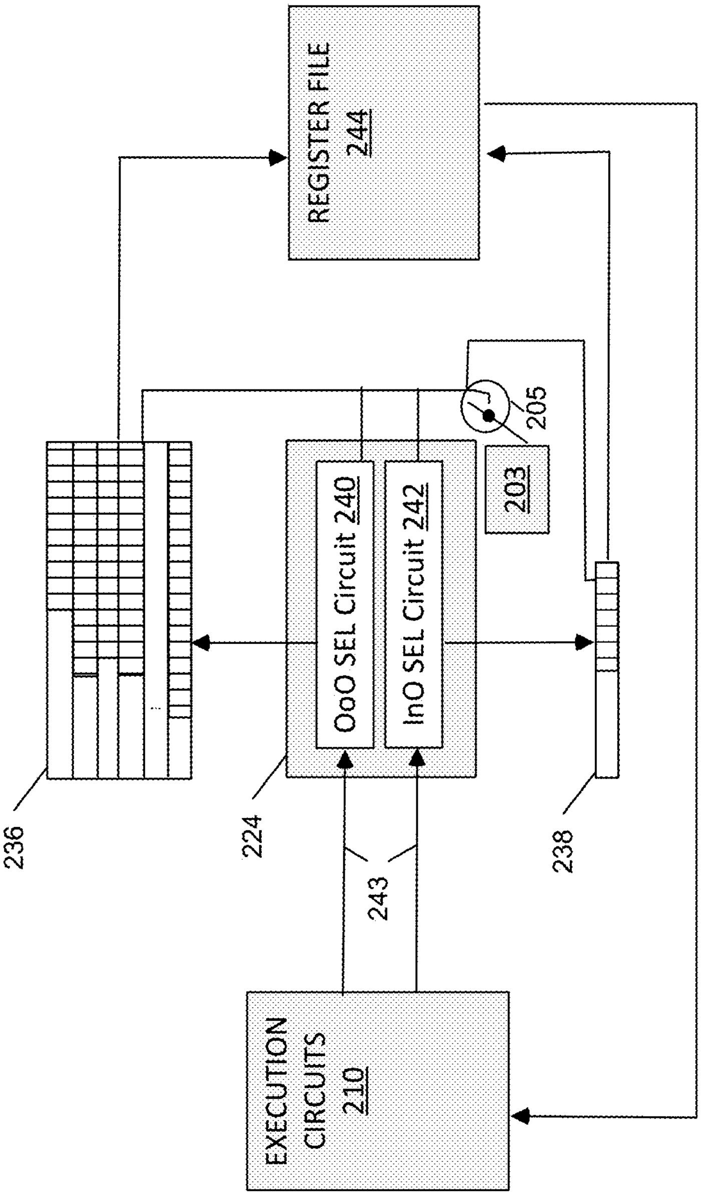
FIG. 2B is a block diagram of a portion of an exemplary scheduler circuit of the exemplary processing unit in FIG. 2A.

To discuss scheduler circuit 224 in more detail, FIG. 2B is a block diagram of a portion of an exemplary scheduler circuit 224 of the exemplary processing unit 202 in FIG. 2A. Referring to FIG. 2B, issue queue free list 236 is shown as an array of independent FIFO queues where each queue is assigned a particular fetch group. Also issue queue 238 is shown as a single FIFO queue having a shorter depth than the depth of the issue queue free list 236 and is assigned entries which are interleaved among a plurality of fetch groups. The scheduler circuit 224 includes an out-of-order select circuit 240 and an in-order select circuit 242. The out-of-order select circuit 240 is used when the out-of-order processing circuits 218 are configured to process instruction out of order. The in-order select circuit 242 is used when the out-of-order processing circuits 218 are configured to process instruction in order.

The out-of-order select circuit 240 is configured to monitor all the downstream instructions being processed to determine which one or more instructions of the downstream instructions will provide a result which is an operand(s) required by an entry in the issue queue free list 236 for execution. The execution circuits 210 signal, utilizing signals 243, the out-of-order select circuit 240 when an executed instruction 206E produces a result which resolves the operand dependencies of the entry in the issue queue free list 236. The out-of-order select circuit 240 also monitors the availability of execution circuits in the execution circuits 210. Once the operand dependency of the selected instruction is resolved and an appropriate execution circuit is available, the out-of-order select circuit 240 directs the entry in the issue queue free list 236 to register file 244 and signals the available execution circuit in the execution circuits 210 to execute the entry. The in-order select circuit 242 implements simpler logic circuits than the out-of-order select circuit 240 since the in-order select circuit 205 is used when the out-of-order processing circuits 218 are configured to process instruction in order which, by definition, cannot dispatch instructions downstream out-of-order. In other words, the in-order select circuit 242 simply waits until the previous in order instruction is executed 206E and its result(s) is written to a register file 244 before releasing the next entry in the issue queue 238 to the instruction circuits 210.

The execution circuits 210 are configured to read operands and register data from the register file 244 and execute the one or more instructions 206I, such as the instructions $I_0$-$I_N$ from the issue queue free list 236 or the issue FIFO queue 238. The commit circuits 226 receive the results of the executed instructions 206E and write back the results to memory including the cache memory system 110 and/or the system memory 120 for use by subsequent instructions. The commit circuits 226, regardless of how the out-of-order circuits 218 are configured, will retire the instructions in order based on the order the instructions are stored in the ROB 230 (note that the data portion of ROB 230 will store instructions in program order when the out-of-order processing circuits 218 are configured to process instruction in order). The commit circuits 226 also clear out the renamed registers associated with the committed instruction to retire the instruction. A pipeline control circuit 203 counts retired instructions 206R. After a number of instructions have been retired, the pipeline control circuit 203 reports to the PUCC 114 performance/power consumption metrics. For example, the pipeline control circuit 203 reports the number of retired instructions per cycle and the power consumed by the processing unit 202 in processing the number of retired instructions.

When the instruction 206I is a result of instructions from an interrupt handler triggered by an interrupt from the PUCC 114 to reconfigure the out-of-order circuits 218, the commit circuits 226 signal the pipeline control circuit 203 to reconfigure the out-of-order circuits 218 to process the plurality of instructions either in order or out of order depending on the type of instruction 206I. For example, if the commit circuits 226 signal the pipeline control circuit 203 to reconfigure the out-of-order circuits 218 to process the plurality of instructions in order, the pipeline control circuit 203 flushes any instruction currently in the in-order circuits 216 and the out-of-order circuits 218, saves the states of all architecture registers to a reserved memory region in the cache memory system 110, decouples a power source 248 and a clock source 250 from the register rename circuit 220, RAT 228, and LDQ 234 through switches 205. Optionally, depending on the amount gained from a performance/power consumption metric by reconfiguring the out-of-order circuits 218 to process instructions in order, the pipeline control circuit 203 may also decouple the power source 248 and the clock source 250 from one or more of the parallel fetch circuits in the fetch circuits 208, decouple the power source 248 and the clock source 250 from one or more of the parallel instruction decode circuits in the instruction decode circuits 214, and decouple the power source 248 and the clock source 250 from one or more of the parallel execution circuits in the execution circuits 210. Switches 205 are one means for decoupling the power source 248 and/or clock source 250 from register rename circuit 220, RAT 228, LDQ 234, one or more of the parallel fetch circuits in the fetch circuits 208, one or more of the parallel instruction decode circuits, and/or one or more of the parallel execution circuits in the execution circuits 210.

Figure 3:
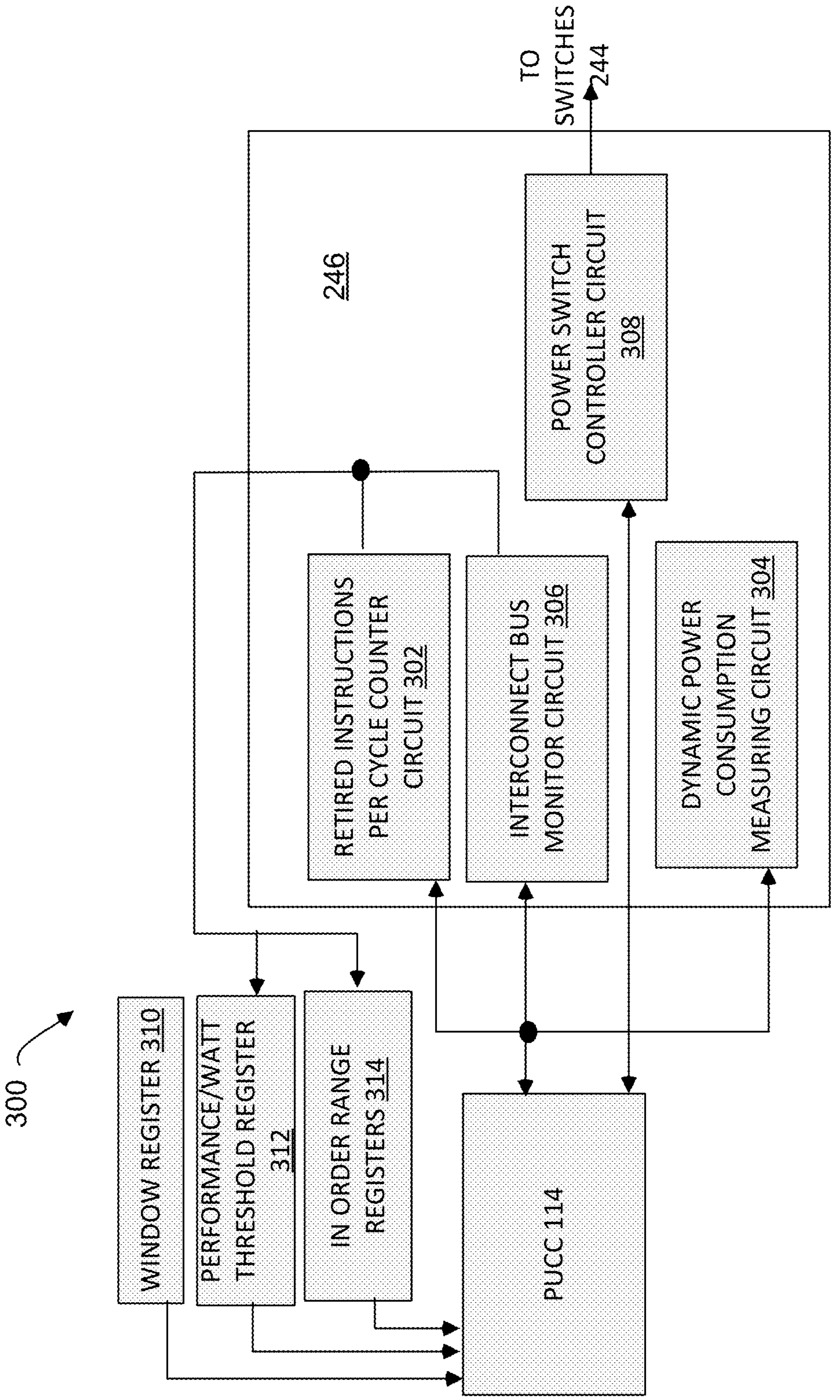
FIG. 3 is a block diagram of a pipeline control circuit of FIG. 2 coupled to a processing unit control circuit to dynamically reconfigure the out-of-order processing circuit in FIG. 2 in the processing unit to process instructions in order based on performance/power consumption of a workload.

FIG. 3 is a block diagram 300 of the pipeline control circuit 203 of FIG. 2A coupled to a PUCC 114 to dynamically reconfigure an out-of-order processing circuit in FIG. 2A in a processing unit to process instructions in order based on performance/power consumption of a workload and vice versa. The pipeline control circuit 203 includes an instructions retired per cycle counter circuit 302, a dynamic power consumption measuring circuit 304, an interconnect bus monitor circuit 306, and a power switch controller circuit 308. The instructions retired per cycle counter circuit 302 counts a number of instructions retired per clock cycle. The dynamic power consumption measuring circuit 304 measures the power consumption of the processing unit 202 after the number of instructions have been retired. The interconnect bus monitor circuit 306 monitors the traffic on interconnect bus 112. The PUCC 114 receives as input data from a window register 310 which stores the number of instructions that have to be retired before the pipeline control circuit 203 samples the instructions retired per cycle counter circuit 302 and takes performance/power consumption measurements. The value stored in the window register 310 will be discussed further in connection with FIG. 4. The PUCC 114 also receives input data from an instructions per cycle (IPC) per watt (IPC/watt) threshold register 312. The IPC/watt threshold register 312 indicates a threshold amount, in terms of instructions per cycle per power consumption, over which the instructions per cycle per power consumption metric can be increased by reconfiguring the out-of-order processing circuits 218 to process instructions in order. The value stored in the IPC/watt threshold register 312 will be discussed further in connection with FIGS. 5-6.

In operation, the PUCC 114 communicates the window register 310 contents to the pipeline control circuit 242. The pipeline control circuit 242 will use the contents of the window register 310 to determine how often performance/power consumption measurements should be taken and reported to the PUCC 114. After every set number of instructions are retired based on the contents of the window register 310, the pipeline control circuit 203 is configured to measure a number of retired instructions in the processing unit 202 per cycle and a power consumption of the processing unit 202 to process the set number of retired instructions. These measurements are reported to the PUCC 114 which is running on a different processing unit than processing unit 202 in the processor-based system 100. The PUCC 114 determines whether the number of the plurality of retired instructions in the processing unit per cycle per the power consumption of the processing unit can be increased beyond an instructions per cycle per power consumption threshold (i.e., contents of the IPC/watt threshold register 312) by reconfiguring the out-of-order circuits 218 to process instructions in order. In particular, the PUCC 114 ensures that the following two conditions are met before instructing the processing unit 202 to reconfigure the out-of-order processing circuits 218 to process instructions in order:

1) The performance improvement achieved by processing instructions out of order relative to processing instructions in order is less than a predefined threshold; and
2) The performance/watt achieved in processing instructions in order is greater than processing instructions out of order.

The first condition above can be optional and is utilized to limit the degradation in performance that would be acceptable to achieve an improved performance per watt metric. Through experimentation the predefined threshold in the first condition above could be between 0-10%. One way the second condition above may be implemented is to configure the pipeline control circuit 203 to determine whether the workload running on the processing unit is either processor bound or I/O bound and thus sets a performance/watt threshold register 312 and a in order range registers 314. The performance/watt threshold register 312 stores a performance/watt target for either a reference processor bound workload or a reference I/O bound workload, respectively. In order range registers 314 store an entry percentage for transitioning from out of order processing to in order processing and an exit percentage for transitioning from in order processing to out of order processing for the associated performance/watt threshold register 312. In particular, the in order range registers 314 will hold an entry percentage for transitioning from out of order processing to in order processing and an exit percentage for transitioning from in order processing to out of order processing. The retired instructions per cycle counter circuit 302 measures the throughput rate and determines whether a workload is processor bound. If it is, retired instructions per cycle counter circuit 302 sets the performance/watt threshold register 312 for a reference processor bound workload and the in order range registers 314 to include an entry percentage for entering into in order processing and an exit percentage for exiting in order processing for the reference processor bound workload. The interconnect bus monitor circuit 306 measures the traffic on the interconnect bus 112 to determine whether a workload is I/O bound and, if so, sets the performance/watt threshold register 312 for a reference I/O bound workload and sets the in order range registers 314 to include an entry percentage for entering into in order processing and an exit percentage for exiting in order processing for the reference I/O bound workload. PUCC 114 uses the reference performance per watt target setting in the performance/watt threshold register 312 to determine a percentage difference between the performance per watt measured by the pipeline control circuit 203 and the target performance per watt stored in the performance/watt threshold register and determines whether that percentage is in the range specified in the in order range registers 314. If the two conditions above are met based on the percentage difference, the PUCC 114 interrupts the processing unit 202 as explained in FIG. 2A to reconfigure the out-of-order processing circuits 218 to process subsequent instructions either in order or out of order depending on the current state in which instructions are being processed. As such, if the out-of-order processing circuits 218 are currently configured to process instruction out of order, the out-of-order processing circuits 218 will be configured to process the plurality of instructions in order, in response to determining the number of the plurality of instructions executed per cycle per the power consumption can be increased beyond the instructions per cycle per power consumption threshold. If the out-of-order processing circuits 218 are currently configured to process instruction in order, the out-of-order processing circuits 218 will be configured to process the plurality of instructions out of order, in response to determining the number of the plurality of instructions executed per cycle per the power consumption can be increased beyond the instructions per cycle per power consumption threshold. Besides discovering whether a workload is processor bound or I/O bound and setting the performance/watt threshold register 312 and the in order range registers 314, accordingly, another way of setting the performance/watt threshold register 312 and the in order range registers 314 include presetting them by various methods including, but not limited to, burning fuses associated with these registers. FIG. 5C illustrates examples of pre-defined performance/watt thresholds and associated percentages the PUCC 114 can use for configuring the out-of-order processing circuits 218 to enter and exit in order processing by presetting the performance/watt threshold register 312 and the in order range registers 314 for an array of benchmarks.

In general, if the out-of-order processing circuit 218 are currently configured to process instructions in order processing, the PUCC 114 is configured to determine whether a number of retired instructions in the processing unit 202 per cycle per a power consumption of the processing unit 202 can be maintained beyond the instructions per cycle per power consumption threshold. If the number of retired instructions in the processing unit 202 per cycle per a power consumption of the processing unit 202 cannot be maintained beyond the instructions per cycle per power consumption threshold, the PUCC 114 instructs the pipeline control circuit 203 to reconfigure the out-of-order processing circuits 218 to process instructions out of order. The out-of-order processing circuits 218 are further configured to process the plurality of instructions out of order, in response to determining the number of the plurality of instructions executed per cycle per the power consumption cannot be maintained beyond the instructions per cycle per power consumption threshold. As described above, workloads are discovered to be either process bound or I/O bound in determining a reference target threshold percentage. Alternative examples of pre-defined reference target thresholds for an array of benchmarks entry points into in order processing and exit points from in order processing are illustrated with FIG. 5C.

Figure 4:
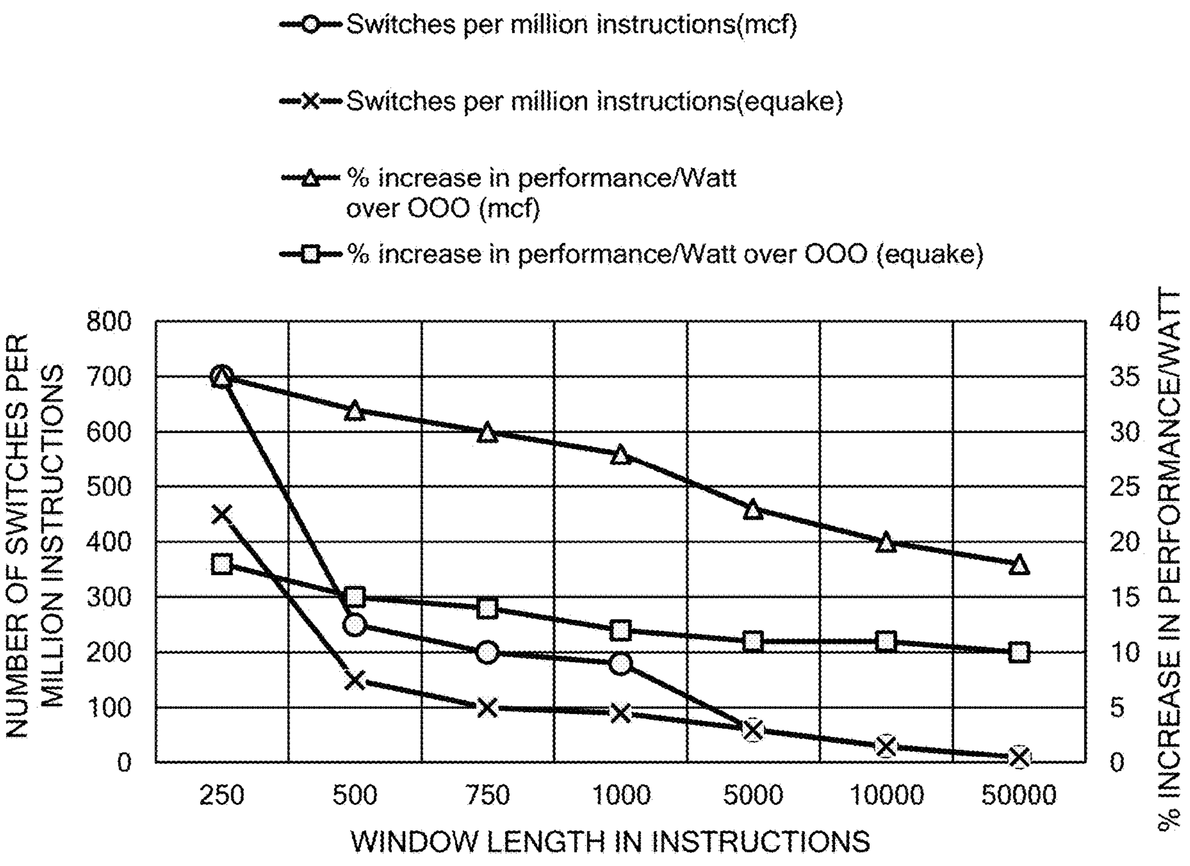
FIG. 4 is a graph illustrating exemplary measurements to determine a number of a plurality of retired instructions for measuring performance per power consumption to determine whether to dynamically reconfigure the out-of-order processing circuit in FIG. 2.

FIG. 4 is a graph 400 illustrating exemplary measurements to determine a number of the plurality of retired instructions for measuring performance per power consumption to determine whether to dynamically reconfigure an out-of-order processing circuit in FIG. 2A. The number of the plurality of retired instructions for measuring performance per power consumption to determine whether to dynamically reconfigure an out-of-order processing circuit is also referred to as the window size. If the window size is too small, frequent switching between in-order processing and out-of-order processing would negate any potential performance/power consumption benefits. On the other hand, if the window size is too large, no benefits may be realized. To determine a window size, experimentation has been utilized. Through experimentation, using the two conditions described in connection with FIG. 3 it was determined that a performance loss between 5-10% for a gain in performance/watt over 25% is acceptable. Several workloads were tested to determine optimum window sizes. The various workloads came from Spek2k17 including the mcf and equate benchmarks. Different window sizes from 250-50000 for these benchmarks were tested. Graph 400 shows the results and the benefits of switching between reconfiguring out-of-order processing circuits 218 from out-of-order and in-order processing and vice versa for these benchmarks. According to graph 400, for small window sizes (approximately 500 retired instructions), a substantial gain in performance/watt over a baseline out-of-order processing is achieved (approximately 15% increase in performance/watt for mcf and approximately 30% increase in performance/watt for equate). The gain in performance/watt begins to decrease with window sizes for these benchmarks after 500 retired instructions. This improvement is expected at the smaller window size because it results in more opportunities to take advantage of reconfiguring the out-of-order processing circuits 218. Hence, theoretically in the absence of mode switching overheads, the smaller the interval the better. From graph 400, it can be seen that increasing the window size from 250 to 500 results in less than 2% gain in performance/Watt for both benchmarks, but the number of switches between out-of-order processing and in-order processing drops significantly (700 to 226 for mcf and 440 to 150 for equake per million instructions executed). This drop off will result in a smaller mode switch overhead. Increasing the window size further results in significant performance/Watt loss (>4%) and no appreciable decrease in the number of switches. The preferable instruction window size for these benchmarks that provide a significant increase in performance/Watt without adding too much overhead due to the number of switches required was found to be 500. Other benchmarks may have different preferable window sizes.

Figure 5A:
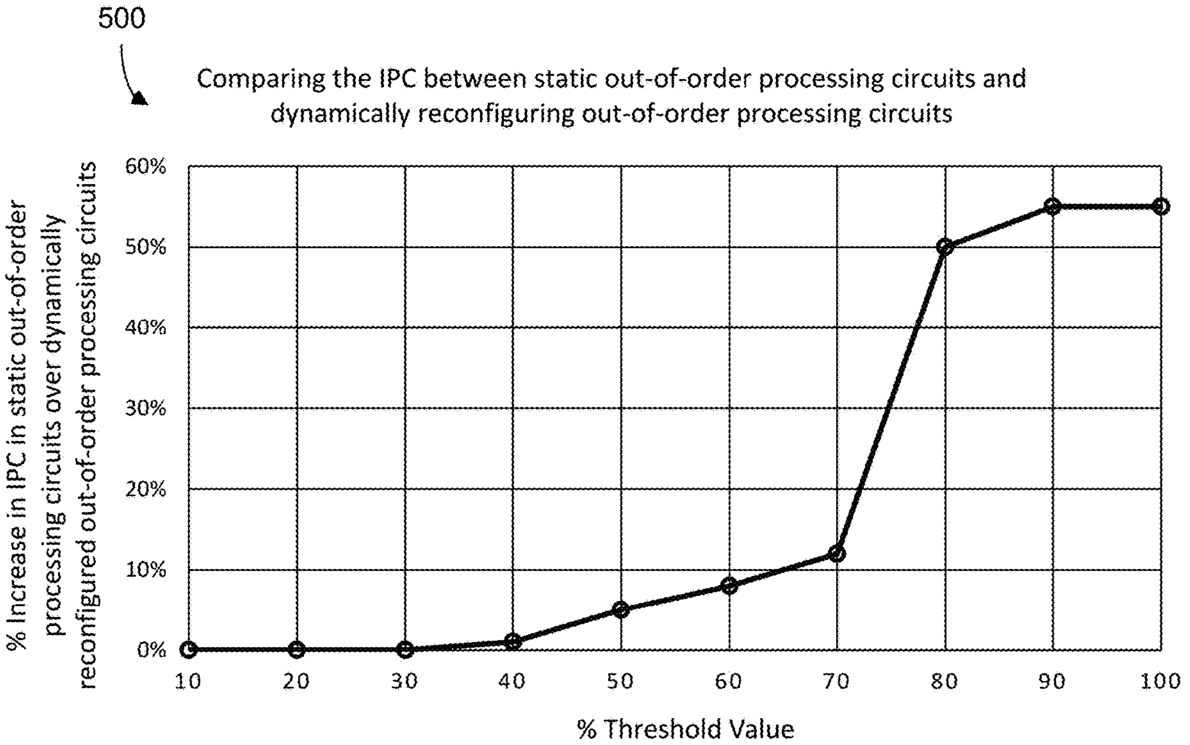
FIG. 5A is a graph plotting the percentage increase in instructions per cycle (IPC) in static out-of-order processing circuits and dynamically reconfigured out-of-order processing circuits over various threshold values.
Figure 5B:
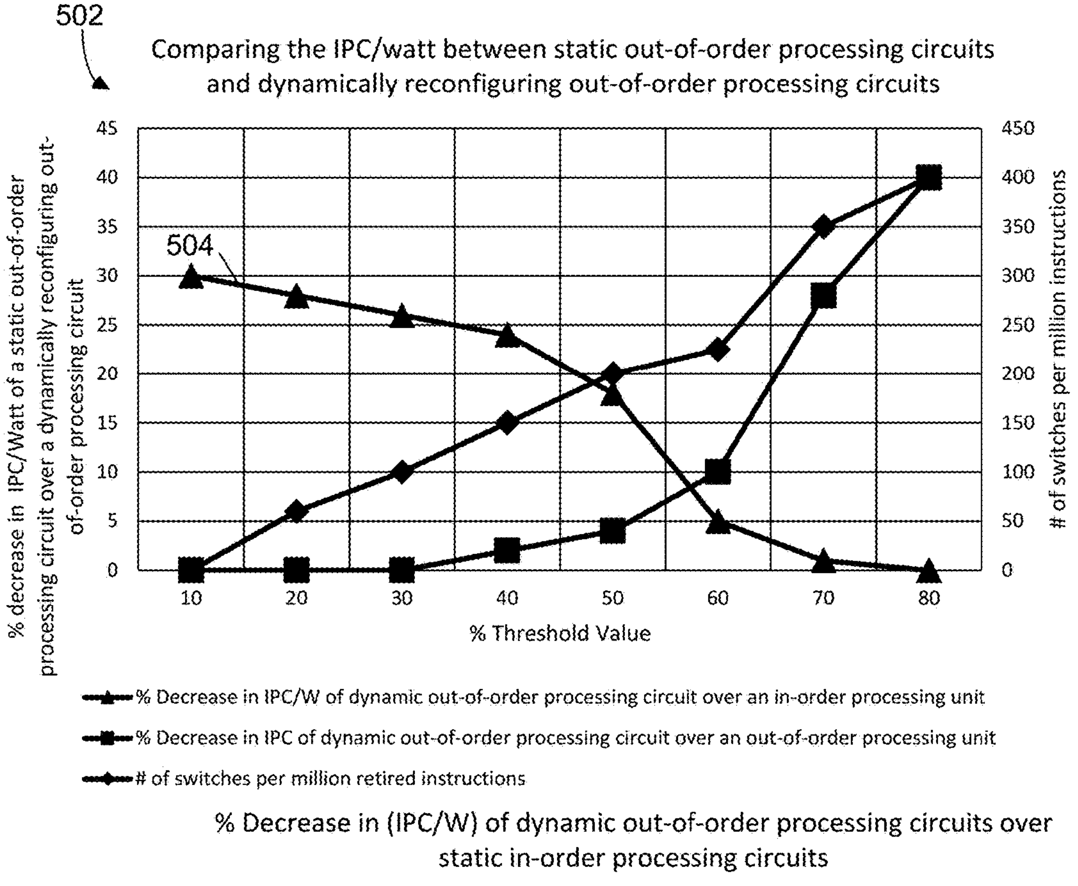
FIG. 5B is a graph comparing the IPC/watt between static out-of-order processing circuits and dynamically reconfigured out-of-order processing circuits to determine an instructions per cycle per power consumption threshold.

FIGS. 5A and 5B are graphs used to determine an instructions per cycle per power consumption threshold used to determine whether to dynamically reconfigure an out-of-order processing circuit in FIG. 2A in a processing unit to process instructions in order based on performance/power consumption of a workload. Experimentation and testing are utilized to determine an instructions per cycle per power consumption threshold. FIG. 5A is a graph 500 plotting the percentage increase in IPC in a static out-of-order processing circuit and a dynamically reconfigured out-of-order processing circuit including, but not limited to, the out-of-order processing circuits 218, over various threshold values. As shown in graph 500, for a low performance threshold between (10-40)%, the overall % increase in IPC of the static out-of-order processing circuit with respect to the dynamically reconfigured out-of-order processing circuit is extremely small. This is expected, since for the low performance threshold, the number of switches, or reconfigurations of the dynamically reconfigured out-of-order processing circuit is quite small. For a performance threshold of greater than 50%, there are more opportunities for reconfiguring the out-of-order processing circuit to process instructions in order. From graph 500, it can be concluded that if the performance threshold is about 60%, the overall performance loss of a dynamically reconfigured out-of-order processing circuit is less than 10% and hence within the acceptable limit when running a benchmark such as mcf.

FIG. 5B is a graph 502 comparing the IPC/watt between static out-of-order processing circuits and dynamically reconfigured out-of-order processing circuits to determine an instructions per cycle per power consumption threshold. Referring to graph 502, at a threshold value between 55-65%, the percentage decrease in IPC of the dynamically reconfigured out-of-order processing circuits over the static out-of-order processing circuits is less than 10%. Plot 504 shows the percentage decrease in performance/watt of a dynamically reconfigured out-of-order processing circuit over an in-order processing unit. Plot 504 is significant because it helps understand the percentage performance/watt that has been lost by running a processing unit having a dynamic reconfigured out-of-order processing circuit as compared to running the same workload completely on an in-order processing unit. Again, at a threshold point between 55-60%, the percent decrease in performance/watt is between 5-10% and the number of switches per million instructions is between 200-250. For a performance threshold greater than 60%, the number of switches increases significantly with not much of a gain in performance/watt. Performance loss suffered by dynamically reconfiguring out-of-order processing circuits also increases steeply for threshold greater than 60%. Thus, a preferable performance threshold lies between 55-60% for the benchmark mcf. To prevent oscillation between operating modes a guard band may be added. For one implementation, the threshold for benchmark mcf is 55% for reconfiguring an out-of-order processing circuit to process instructions in order and 65% for reconfiguring an out-of-order processing circuit to process instructions out of order.

As describe in FIG. 3, the performance/watt threshold register 312 stores a performance per watt target for a workload, respectively, and the in order range registers 314 store the percentages of the performance per watt target relative to the measured performance per watt of the workload for entering and exiting in order processing. These registers can be preset for particular types of workloads. Experimentation, testing and analysis has been done to find the appropriate performance target thresholds for the different benchmarks. An alternative to the approach discussed above, different known benchmarks and their entry and exit percentages can be preset in the pipeline control circuit 203. The table below shows the different entry and exit percentages for various benchmarks. FIG. 5C is a table 506 illustrating an exemplary set of pre-defined instructions per cycle per power consumption thresholds for an array of benchmarks. Column 508 includes instructions per cycle per power consumption thresholds or targets for a nominal voltage/frequency of a processing unit. Column 510 includes associated percentage thresholds for entering and exiting in order processing for particular benchmarks. The performance/watt threshold register 312 can be assigned any one of the performance/watt targets in column 508. The in order range registers 314 can be assigned any one of the entry and exit threshold percentages listed in column 510. A generic threshold percentage range between 50-70 could be used when a processing unit has not determined the particular workload that the processing unit is processing.

Figure 6:
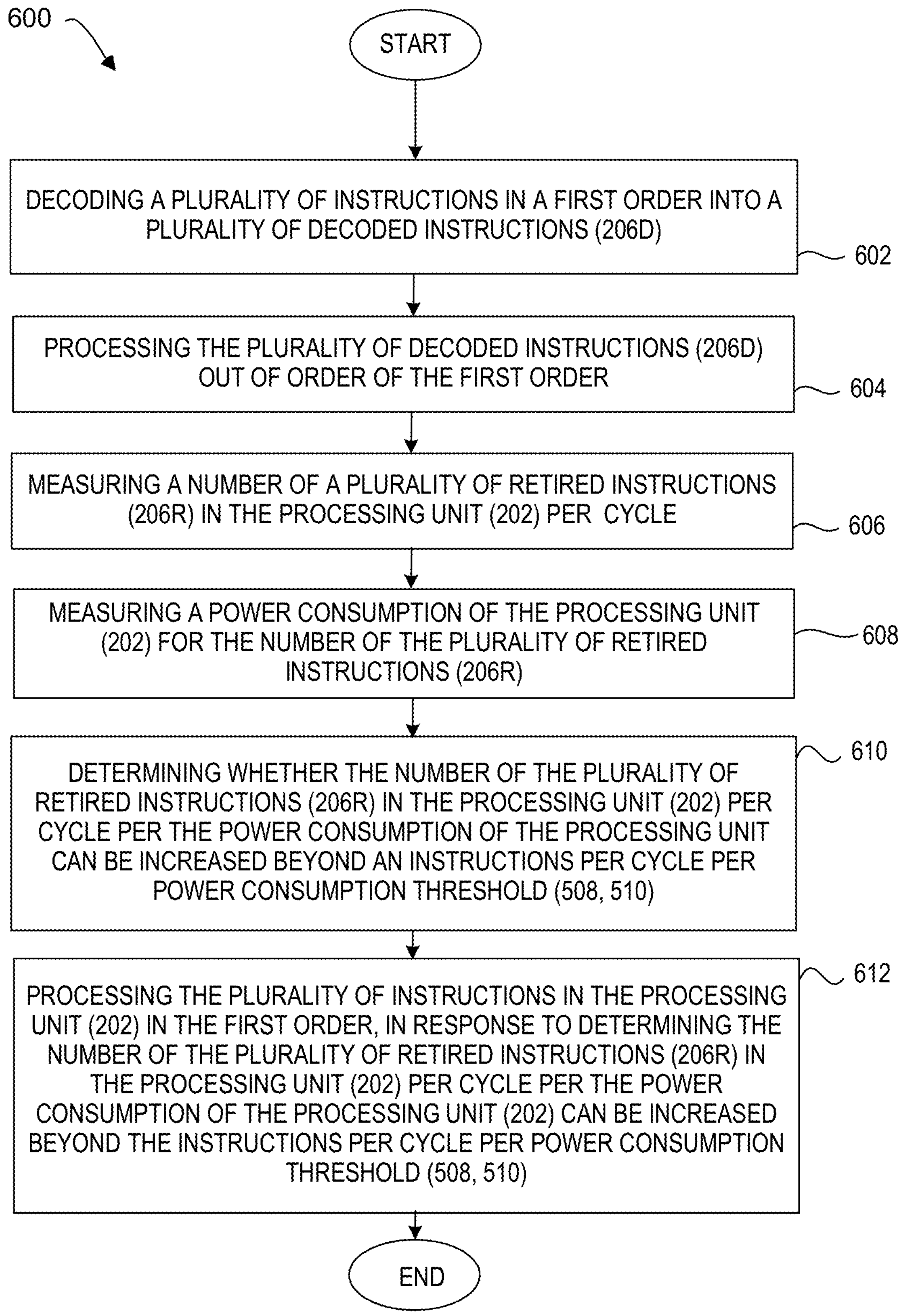
FIG. 6 is a flowchart of an exemplary process for dynamically reconfiguring an out-of-order processing circuit in a processing unit to process instructions in order based on performance/power consumption of a workload.

FIG. 6 is a flowchart of an exemplary process 600 for dynamically reconfiguring an out-of-order processing circuit in a processing unit 202 to process instructions in order based on performance/power consumption of a workload. In this regard, a first exemplary step in the process 600 of FIG. 6 can include decoding a plurality of instructions in a first order into a plurality of decoded instructions 206D (block 602 in FIG. 6). A next step in the process 600 can include processing the plurality of decoded instructions 206D out of order of the first order (block 604 in FIG. 6). A next step in the process 600 can include measuring a number of a plurality of retired instructions 206R in the processing unit 202 per cycle (block 606 in FIG. 6). One means for measuring the number of the plurality of retired instructions per cycle includes utilizing the instructions retired per cycle counter circuit 302 discussed in FIG. 3. A next step in the process 600 can include measuring a power consumption of the processing unit 202 for the number of the plurality of retired instructions 206R (block 608 in FIG. 6). One means for measuring the power consumption of the processing unit 202 for the number of the plurality of retired instructions includes utilizing the dynamic power consumption measuring circuit 304 discussed in connection with FIG. 3. A next step in the process 600 can include determining whether the number of the plurality of retired instructions 206R in the processing unit 202 per cycle per the power consumption of the processing unit can be increased beyond an instructions per cycle per power consumption threshold 508, 510 (block 610 in FIG. 6). One means for determining whether the number of the plurality of retired instructions 206R in the processing unit 202 per cycle per the power consumption of the processing unit can be increased beyond the instructions per cycle per power consumption threshold includes discovering whether the workload is processor or I/O bound as discussed in FIG. 3, setting the predefined threshold register 314 to have an entry and exit percentage as described in connection with FIG. 5C, and determining whether the measured performance per watt percentage is within the entry and exit percentage while the out-of-order processing circuit was configured to process instructions out of order. A next step in the process 600 can include processing the plurality of instructions in the processing unit 202 in the first order, in response to determining the number of the plurality of retired instructions 206R in the processing unit 202 per cycle per the power consumption of the processing unit 202 can be increased beyond the instructions per cycle per power consumption threshold 508, 510 (block 612 in FIG. 6).

Electronic devices that include a processor-based system that includes multiple processing units (PUs) and a memory system that includes a cache memory system including a hierarchy of local and shared cache memories and a system memory, and wherein the processor-based system includes a PUCC which dynamically reconfigures an out-of-order processing circuit in a processing unit to process instructions in order based on performance/power consumption of a workload, including, but not limited to, the processor-based system 100, PUs 104(0)-104(N), 202, PUCC 114, and out-of-order processing circuits 218 in FIGS. 1 and 2 and according to, but not limited to, any of the exemplary processes such as the process 600 in FIG. 6, and according to any aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 7:
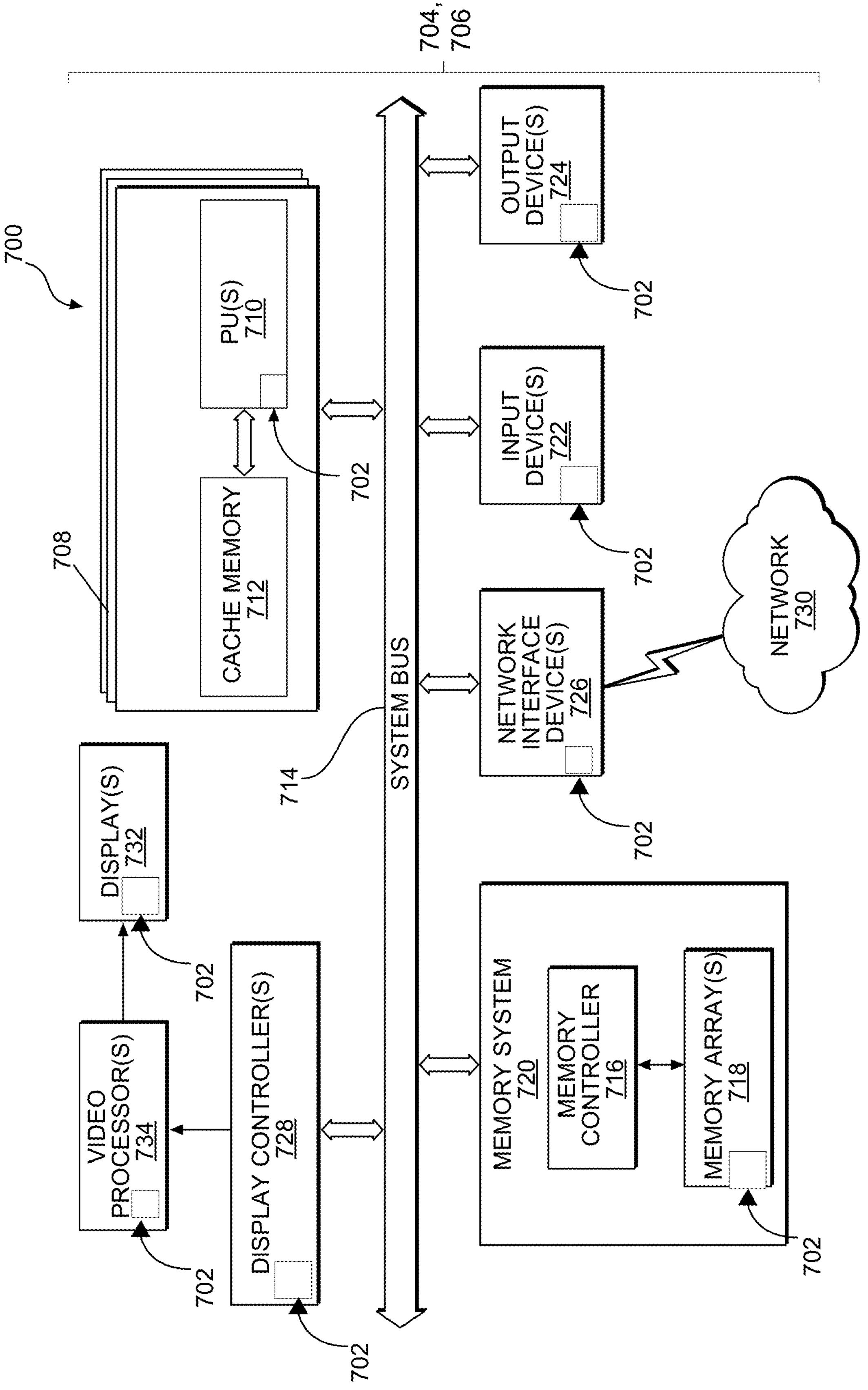
FIG. 7 is a block diagram of an exemplary processor-based system that can include multiple processing units to dynamically reconfigure an out-of-order processing circuit in a processing unit to process instructions in order based on performance/power consumption of a workload being processed on a respective processing unit including, but not limited to, the processing unit illustrated in FIGS. 1 and 2 and according to, but not limited to, the exemplary process in FIG. 6.

In this regard, FIG. 7 illustrates an example of a processor-based system 700 that includes multiple processing units (PUs) and a memory system that includes a cache memory system including a hierarchy of local and shared cache memories and a system memory, and wherein the processor-based system includes a PUCC which dynamically reconfigures an out-of-order processing circuit in a processing unit to process instructions in order based on performance/power consumption of a workload, including, but not limited to, the processor-based system 100, PUs 104(0)-104(N), 202, PUCC 114, and out-of-order processing circuits 218 in FIGS. 1 and 2 and according to, but not limited to, the exemplary process 600 in FIG. 6, and according to any aspects disclosed herein, that may be provided in or integrated into any processor-based device. In this example, the processor-based system 700 may be formed as an IC 704 and includes a PUCC 702 and may be deployed as a system-on-a-chip (SoC) 706. The processor-based system 700 may include one or more processors 708 which include a PU 710, which may also be referred to as PU or central processing unit (CPU) cores or processor cores. The PU 710 may have cache memory 712 coupled to the PU 710 for rapid access to temporarily stored data. The PU 710 is coupled to a system bus 714 and can intercouple server and client devices included in the processor-based system 700. As is well known, the PU 710 communicates with these other devices by exchanging address, control, and data information over the system bus 714. For example, the PU 710 can communicate bus transaction requests to a memory controller 716, as an example of a client device. Although not illustrated in FIG. 7, multiple system buses 714 could be provided, wherein each system bus 714 constitutes a different fabric.

Other server and client devices can be connected to the system bus 714. As illustrated in FIG. 7, these devices can include a memory system 720 that includes the memory controller 716 and a memory array(s) 718, one or more input devices 722, one or more output devices 724, one or more network interface devices 726, and one or more display controllers 728, as examples. The input device(s) 722 can include any type of input device, including, but not limited to, input keys, switches, voice processors, etc. The output device(s) 724 can include any type of output device, including, but not limited to, audio, video, other visual indicators, etc. The network interface device(s) 726 can be any device configured to allow exchange of data to and from a network 730. The network 730 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 726 can be configured to support any type of communications protocol desired.

The PU 710 may also be configured to access the display controller(s) 728 over the system bus 714 to control information sent to one or more displays 732. The display controller(s) 728 sends information to the display(s) 732 to be displayed via one or more video processor(s) 734, which process the information to be displayed into a format suitable for the display(s) 732. The display(s) 732 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium wherein any such instructions are executed by a processor or other processing device, or combinations of both. The devices and components described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

Implementation examples are described in the following numbered clauses:

1. A processor-based system, comprising:
   a first processing unit comprising:
      an in-order processing circuit configured to decode a plurality of instructions in a first order into a plurality of decoded instructions; and
      an out-of-order processing circuit configured to process the plurality of decoded instructions out of order of the first order;
      the first processing unit configured to:
         measure a number of a plurality of retired instructions in the first processing unit per cycle;
         measure a power consumption of the first processing unit for the number of the plurality of retired instructions;
      the processor-based system configured to determine whether the number of the plurality of retired instructions in the first processing unit per cycle per the power consumption of the first processing unit can be increased beyond an instructions per cycle per power consumption threshold; and
      the out-of-order processing circuit further configured to process the plurality of instructions in the first processing unit in the first order, in response to the determination that the number of the plurality of retired instructions in the first processing unit per cycle per the power consumption of the first processing unit can be increased beyond the instructions per cycle per power consumption threshold.
2. The processor-based system of clause 1, wherein the first processing unit is further configured to:
   flush instructions in the first processing unit, in response to the determination that the number of the plurality of retired instructions in the first processing unit per cycle per the power consumption of the first processing unit can be increased beyond the instructions per power consumption threshold.
3. The processor-based system of clause 1 or 2, wherein:
   the out-of-order processing circuit further comprises:
      a plurality of out-of-order buffers coupled to a power source; and the first processing unit is further configured to:

decouple the plurality of out-of-order buffers from the power source.

4. The processor-based system of clause 3, wherein the plurality of out-of-order buffers comprises:
   a register alias table (RAT);
   a re-order buffer (ROB); and
   a load queue (LDQ).
5. The processor-based system of any of clauses 1-4, wherein the first processing unit further comprises:
   a plurality of parallel fetch circuits coupled to the power source;
   wherein the first processing unit, in response to the determination that the number of the plurality of retired instructions in the first processing unit per cycle per the power consumption of the first processing unit can be increased beyond the instructions per cycle per power consumption threshold, is further configured to:
      decouple one or more of the plurality of parallel fetch circuits from the power source.
6. The processor-based system of any of clauses 1-5, wherein the first processing unit further comprises:
   a plurality of parallel instruction decode circuits coupled to the power source;
   wherein the first processing unit, in response to the determination that the number of the plurality of retired instructions in the first processing unit per cycle per the power consumption of the first processing unit can be increased beyond the instructions per cycle per power consumption threshold, is further configured to:
      decouple one or more of the plurality of parallel instruction decode circuits from the power source.
7. The processor-based system of any of clauses 1-6, wherein the first processing unit further comprises:
   a plurality of parallel execution circuits coupled to the power source;
   wherein the first processing unit, in response to the determination that the number of the plurality of retired instructions in the first processing unit per cycle per the power consumption of the first processing unit can be increased beyond the instructions per cycle per power consumption threshold, is further configured to:
      decouple the power source from one or more of the plurality of parallel execution circuits.
8. The processor-based system of any of clauses 1-7, wherein:
   the first processing unit is further configured to:
      measure a second number of the plurality of retired instructions in the first processing unit per cycle; and
      measure a second power consumption of the first processing unit;
   the processor-based system is configured to determine whether the second number of the plurality of retired instructions in the first processing unit per cycle per the second power consumption of the first processing unit cannot be maintained beyond the instructions per cycle per power consumption threshold; and
   the out-of-order processing circuit is further configured to process the plurality of instructions out of order of the first order, in response to the determination that the second number of the plurality of retired instructions in the first processing unit per cycle per the second power consumption of the first processing unit cannot be maintained beyond the instructions per cycle per power consumption threshold.
9. The processor-based system of any of clauses 1-8, wherein the number of the plurality of retired instructions is approximately 500 instructions.
10. A method for dynamically reconfiguring out-of-order processing circuits in a first processing unit, comprising:
   decoding a plurality of instructions in a first order into a plurality of decoded instructions;
   processing the plurality of decoded instructions out of order of the first order;
   measuring a number of a plurality of retired instructions in the first processing unit per cycle;
   measuring a power consumption of the first processing unit for the number of the plurality of retired instructions;
   determining whether the number of the plurality of retired instructions in the first processing unit per cycle per the power consumption of the first processing unit can be increased beyond an instructions per cycle per power consumption threshold; and
   processing the plurality of instructions in the first processing unit in the first order, in response to determining the number of the plurality of retired instructions in the first processing unit per cycle per the power consumption of the first processing unit can be increased beyond the instructions per cycle per power consumption threshold.
11. The method of clause 10, wherein processing the plurality of instructions in the first processing unit in the first order further comprises:
   flushing instructions in the first processing unit, in response to determining the number of the plurality of retired instructions in the first processing unit per cycle per the power consumption of the first processing unit can be increased beyond the instructions per cycle per power consumption threshold.
12. The method of clause 10 or 11, wherein processing the plurality of instructions in the first processing unit in the first order further comprises:
   decoupling a plurality of out-of-order buffers from a power source.
13. The method of clause 12, wherein the plurality of out-of-order buffers comprises:
   a register alias table (RAT);
   a re-order buffer (ROB); and
   a load queue (LDQ).
14. The method of any of clauses 10-13, wherein processing the plurality of instructions in the first processing unit in the first order further comprises:
   decoupling one or more of a plurality of parallel fetch circuits from the power source.
15. The method of any of clauses 10-14, wherein processing the plurality of instructions in the first processing unit in the first order further comprises:
   decoupling one or more of a plurality of parallel instruction decode circuits from the power source.
16. The method of any of clauses 10-15, wherein processing the plurality of instructions in the first processing unit in the first order further comprises:
   decoupling one or more of a plurality of parallel execution circuits from the power source.
17. The method of any of clauses 10-16, further comprising:
   measuring a second number of the plurality of retired instructions in the first processing unit per cycle;

measuring a second power consumption of the first processing unit;

determining whether the second number of the plurality of retired instructions in the first processing unit per cycle per the second power consumption of the first processing unit cannot be maintained beyond the instructions per cycle per power consumption threshold; and processing the plurality of instructions out of order of the first order, in response to determining the second number of the plurality of retired instructions per cycle per the second power consumption of the first processing unit cannot be maintained beyond the instructions per cycle per power consumption threshold.

18. The method of any of clauses 10-17, wherein the number of the plurality of retired instructions is approximately 500 instructions.

19. A processor-based system for dynamically reconfiguring out-of-order processing circuits in a first processing unit, comprising:

means for decoding a plurality of instructions in a first order into a plurality of decoded instructions;

means for processing the plurality of decoded instructions out of order of the first order;

means for measuring a number of a plurality of retired instructions in the first processing unit per cycle;

means for measuring a power consumption of the first processing unit for the number of the plurality of retired instructions;

means for determining whether the number of the plurality of retired instructions in the first processing unit per cycle per the power consumption of the first processing unit can be increased beyond an instructions per cycle per power consumption threshold; and means for processing the plurality of instructions in the first processing unit in the first order, in response to the determination that the number of the plurality of retired instructions in the first processing unit per cycle per the power consumption of the first processing unit can be increased beyond the instructions per cycle per power consumption threshold.

20. The processor-based system of clause 19, wherein the means for processing the plurality of instructions in the first processing unit in the first order further comprises: means for decoupling a plurality of out-of-order buffers from a power source.

What is claimed is:

1. A processor-based system, comprising:

a first processing unit comprising:

an instruction decode circuit configured to decode a plurality of instructions in a first order into a plurality of decoded instructions; and an out-of-order processing circuit configured to process the plurality of decoded instructions out of order of the first order;

the first processing unit configured to:

measure, using a retired-instruction counter, over a bounded sampling window, a retired-instruction throughput of the first processing unit; and measure, using a power measurement circuit, a dynamic power consumption of the first processing unit during the bounded sampling window;

a control circuit configured to determine whether an instruction-throughput-per-power efficiency metric, computed based on the retired-instruction throughput normalized by the measured dynamic power consumption, satisfies a threshold condition; and the out-of-order processing circuit further configured to selectively process at least a subset of the plurality of instructions in the first processing unit in the first order while remaining within the first processing unit, in response to the determination that the instruction-throughput-per-power efficiency metric satisfies the threshold condition.

2. The processor-based system of claim 1, wherein the first processing unit is further configured to:

flush instructions in the first processing unit, in response to the determination that the instruction-throughput-per-power efficiency metric satisfies the threshold condition.

3. The processor-based system of claim 1, wherein:

the out-of-order processing circuit further comprises:

a plurality of out-of-order buffers coupled to a power source; and the first processing unit is further configured to:

decouple the plurality of out-of-order buffers from the power source.

4. The processor-based system of claim 3, wherein the plurality of out-of-order buffers comprises:

a register alias table (RAT);

a re-order buffer (ROB); and a load queue (LDQ).

5. The processor-based system of claim 3, wherein the first processing unit further comprises:

a plurality of parallel fetch circuits coupled to the power source;

wherein the first processing unit, in response to the determination that the instruction-throughput-per-power efficiency metric satisfies the threshold condition, is further configured to:

decouple one or more of the plurality of parallel fetch circuits from the power source.

6. The processor-based system of claim 3, wherein the first processing unit further comprises:

a plurality of parallel instruction decode circuits coupled to the power source;

wherein the first processing unit, in response to the determination that the instruction-throughput-per-power efficiency metric satisfies the threshold condition, is further configured to:

decouple one or more of the plurality of parallel instruction decode circuits from the power source.

7. The processor-based system of claim 3, wherein the first processing unit further comprises:

a plurality of parallel execution circuits coupled to the power source;

wherein the first processing unit, in response to the determination that the instruction-throughput-per-power efficiency metric satisfies the threshold condition, is further configured to:

decouple the power source from one or more of the plurality of parallel execution circuits.

8. The processor-based system of claim 1, wherein:

the first processing unit is further configured to:

measure a second retired-instruction throughput over a second bounded sampling window; and measure a second dynamic power consumption of the first processing unit during the second bounded sampling window;

the control circuit is further configured to determine whether a second instruction-throughput-per power efficiency metric, computed based on the second retired-instruction throughput normalized by the measured second dynamic power consumption, satisfies the threshold condition; and the out-of-order processing circuit is further configured to selectively process at least a subset of the plurality of instructions in the first processing unit out of order of the first order, in response to the determination that the second instruction-throughput-per-power efficiency metric does not satisfy the threshold condition.

9. The processor-based system of claim 1, wherein the bounded sampling window is between 400 and 600 instructions.

10. A method for dynamically reconfiguring out-of-order processing circuits in a first processing unit, comprising:

decoding a plurality of instructions in a first order into a plurality of decoded instructions;

processing the plurality of decoded instructions out of order of the first order;

measuring over a bounded sampling window, a retired-instruction throughput of the first processing unit;

measuring a dynamic power consumption of the first processing unit during the bounded sampling window;

determining whether an instruction-throughput-per-power efficiency metric computed based on the retired-instruction throughput normalized by the measured dynamic power consumption satisfies a threshold condition; and selectively processing at least a subset of the plurality of instructions in the first processing unit in the first order while remaining within the first processing unit, in response to determining that the instruction-throughput-per-power efficiency metric satisfies the threshold condition.

11. The method of claim 10, wherein selectively processing at least the subset of the plurality of instructions in the first processing unit in the first order further comprises:

flushing instructions in the first processing unit, in response to determining that the instruction-throughput-per-power efficiency metric satisfies the threshold condition.

12. The method of claim 10, wherein selectively processing at least the subset of the plurality of instructions in the first processing unit in the first order further comprises:

decoupling a plurality of out-of-order buffers from a power source.

13. The method of claim 12, wherein the plurality of out-of-order buffers comprises:

a register alias table (RAT);

a re-order buffer (ROB); and a load queue (LDQ).

14. The method of claim 12, wherein selectively processing at least the subset of the plurality of instructions in the first processing unit in the first order further comprises:

decoupling one or more of a plurality of parallel fetch circuits from the power source.

15. The method of claim 12, wherein selectively processing at least the subset of the plurality of instructions in the first processing unit in the first order further comprises:

decoupling one or more of a plurality of parallel instruction decode circuits from the power source.

16. The method of claim 12, wherein selectively processing at least the subset of the plurality of instructions in the first processing unit in the first order further comprises:

decoupling one or more of a plurality of parallel execution circuits from the power source.

17. The method of claim 10, further comprising:

measuring a second retired-instruction throughput over a second bounded sampling window;

measuring a second dynamic power consumption of the first processing unit during the second bounded sampling window;

determining whether a second instruction-throughput-per power efficiency metric, computed based on the second retired-instruction throughput normalized by the measured second dynamic power consumption, satisfies the threshold condition; and selectively processing at least a subset of the plurality of instructions in the first processing unit out of order of the first order, in response to determining that the second instruction-throughput-per-power efficiency metric does not satisfy the threshold condition.

18. The method of claim 10, wherein the bounded sampling window is between 400 and 600 instructions.

19. A processor-based system for dynamically reconfiguring out-of-order processing circuits in a first processing unit, comprising:

means for decoding a plurality of instructions in a first order into a plurality of decoded instructions;

means for processing the plurality of decoded instructions out of order of the first order;

means for measuring over a bounded sampling window, a retired-instruction throughput of the first processing unit;

means for measuring a dynamic power consumption of the first processing unit during the bounded sampling window;

means for determining whether an instruction-throughput-per-power efficiency metric, computed based on the retired-instruction throughput normalized by the measured dynamic power consumption, satisfies a threshold condition; and means for selectively processing at least a subset of the plurality of instructions in the first processing unit in the first order while remaining within the first processing unit, in response to determining that the instruction-throughput-per-power efficiency metric satisfies the threshold condition.

20. The processor-based system of claim 19, wherein the means for selectively processing the at least the subset of the plurality of instructions in the first processing unit in the first order further comprises:

means for decoupling a plurality of out-of-order buffers from a power source, in response to determining that the instruction-throughput-per-power efficiency metric satisfies the threshold condition.

* * * * *